United States Patent [19]

Zoeller

[11] Patent Number: 4,650,649

[45] Date of Patent: Mar. 17, 1987

[54] CATALYST RECOVERY PROCESS

[75] Inventor: Joseph R. Zoeller, Kingsport, Tenn.

[73] Assignee: Eastman Kodak Company, Rochester, N.Y.

[21] Appl. No.: 820,058

[22] Filed: Jan. 21, 1986

[51] Int. Cl.⁴ ............................................. C01G 55/00
[52] U.S. Cl. ....................................... 423/22; 502/24; 502/28; 502/33
[58] Field of Search ...................... 423/22; 502/24, 28, 502/33

[56] References Cited

U.S. PATENT DOCUMENTS

| | | | |
|---|---|---|---|
| 4,434,240 | 2/1984 | Pugach | 423/22 |
| 4,434,241 | 2/1984 | Larkins | 423/22 |
| 4,440,570 | 4/1984 | Erpenbach et al. | 423/22 |
| 4,442,304 | 4/1984 | Erpenbach et al. | 502/24 |
| 4,476,237 | 10/1984 | Porcelli | 502/28 |
| 4,476,238 | 10/1984 | Palmer et al. | 502/33 |
| 4,557,760 | 12/1985 | Erpenbach et al. | 423/22 |

*Primary Examiner*—H. T. Carter
*Attorney, Agent, or Firm*—Charles R. Martin; J. Frederick Thomsen; Clyde L. Tootle

[57] ABSTRACT

This invention relates to a novel process for recovering catalyst components and, more particularly, to a method for recovering both iodine and noble metal components such as rhodium from tars formed during the preparation of acetic anhydride by the iodine and noble metal catalyzed carbonylation of methyl acetate.

8 Claims, No Drawings

CATALYST RECOVERY PROCESS

This invention relates to a novel process for recovering catalyst components and, more particularly, to a method for recovering both iodine and noble metal components such as rhodium from tars formed during the preparation of acetic anhydride by the iodine and noble metal catalyzed carbonylation of methyl acetate.

The use of catalyst systems comprising noble metals and an iodine compound in the preparation of acetic anhyride by the carbonylation of methyl acetate is well known in the art. Some of this prior art is, for example, Belgian Pat. No. 819,455, British Published Patent Application No. 2,013,184, Japanese Published Patent Applications Nos. 75-47921 and 75-47922 and U.S. Pat. Nos. 3,927,078 and 4,046,807. These patents and publications also disclose that the reaction rate can be increased if the catalyst system contains a promoter such as certain amines, phosphines and inorganic materials such as lithium compounds. However, the use of amines and phosphines, particularly under reaction conditions giving high space-time yields, cause formation of tars which encapsulate the noble metal catalyst. The use of lithium compounds, such as lithim iodide or lithium acetate, can also reduce or retard but not prevent this tar formation. It is also known in U.S. Pat. No. 4,046,807 that the addition of hydrogen in the gas feed to the carbonylation reactor in a system employing triphenylphosphine can also reduce but not eliminate tar formation. It is necessary that the tar formed in such process be removed from the reaction system since the tar can reduce catalyst activity and can even result in termination of the carbonylation reaction by catalyst deactivation by encapsulation of the iodine and noble metal catalyst.

Moreover, because of the expense of catalyst components, such as rhodium, it is extremely desirable to recover as much of the rhodium as possible from the tar formed in the iodine and rhodium catalyzed carbonylation of methyl acetate. A variety of methods have been disclosed in the art for such catalyst recovery. One such process, for example, is disclosed in U.S. Pat. No. 4,388,217, which discloses an extraction process using methyl iodide and aqueous hydrogen iodide which provides good recovery of the rhodium from the tar formed. This extraction recovers about 90 weight percent of the rhodium from the extracted tar but none of the iodide. Attempts have also been made to recover the additional 10 weight percent of rhodium from the tar prior to ashing. One such process is disclosed in U.S. Pat. No. 4,364,907 which discloses an additional extraction of the aqueous HI extracted tar with aqueous ammonia to remove an additional amount of rhodium from the tar. This process however requires subsequent removal of the ammonia from the process streams which are to be returned to the reaction. Therefore, these prior processes are directed primarily to recovery of the noble metal catalyst component. The iodine however is not recovered and is disposed of in the ashing of the tar residue. It would, therefore, be an advance in the state of the art to provide an improved recovery process for the recovery of increased amounts of the noble metals, such as rhodium, as well as the iodine from tar formed in carbonylation processes before ashing.

In accordance with the present invention, it has been found that a substantial amount of iodine can be recovered from the tar by the addition of a lower fatty acid to the tar and distilling the lower fatty acid from the tar. During distillation the iodine is entrained in the fatty acid being distilled and is removed from the tar. The fatty acid treated tar is then dissolved in a suitable organic solvent which precipitates the noble metal which can then be recovered, for example, by filtration. The organic solvent can then be recovered by distillation from the tar residue. The tar residue can then be ashed and any remaining noble metal can be recovered and returned or recycled to the carbonylation process.

Typically, the tar is removed continuously or intermittently from the carbonylation system in the form of a solution in a mixture of the compounds present in the system. The tar-containing solution may be removed either directly from the reactor or, in the case of a system employing a liquid product takeoff from the reactor, from some point in the normal catalyst recycle stream. The tar-containing solution can then be concentrated by stripping off some of the liquids present. In production facilities where the rhodium is recycled to the reactor, the tar-containing recycle stream normally will have been concentrated to some extent in the product recovery section of the production facilities.

The fatty acid, such as acetic acid, is added to the concentrated tar and the mixture is then heated to a temperature at or above the boiling point of the fatty acid. The fatty acid is distilled with additional fatty acid being continuously added to maintain the fatty acid and tar at a ratio of about 1 to 25 parts by weight fatty acid to one part by weight tar, preferably 5 to 10 parts fatty acid to one part tar. The treated tar can then be cooled and a suitable organic solvent such as methyl acetate is added in an amount of one part tar to 1 to 25 parts by weight organic solvent which dissolves the tar, preferably 5 to 10 parts solvent to one part tar, and the noble metal precipitates out of the solution. An amount below one part tar to one part organic solvent does not adequately dissolve the tar and amounts greater than 25 parts organic solvent to one part tar does not improve catalyst recovery but does increase the energy required for the recovery of the solvent. The amount of iodine recovered by this fatty acid distillation is about 40 to 90 weight percent of the iodine present in the tar. If acetic acid is used in the reaction as the fatty acid, the acetic acid and iodine recovered in the distillation can be returned to the reactor without being separately recovered.

The fatty acid can be any fatty acid containing 2 to about 12 carbon atoms and mixtures of such acids. Such acids are, for example, acetic acid, butyric acid, propanoic acid and the like. The preferred fatty acid is acetic acid.

The distillation time can also vary depending on the amount of tar, amount of iodine present in the tar and efficiency of the extraction desired. For example, about 70 to 80 percent of iodine is recovered from the tar after distillation for a period of 6 to 8 hours.

The temperature employed is generally the boiling point of the fatty acid. However, higher temperatures can be used in pressure equipment. Lower temperatures do not provide the desired result as iodide is not recovered unless the fatty acid is distilled from the tar. For example, particularly good recovery results are obtained using acetic acid in an amount of one part extracted tar to twenty five parts acetic acid and heating at 120° C. and distilling acetic acid for eight hours. Only about 66 percent of the iodine is removed from the tar on distilling the acetic acid for a period of only two hours. Methyl acetate can then be added to dissolve the tar and the noble metal, such as rhodium, precipitates out and can be recovered by filtration. The remaining tar can then be ashed to recover any remaining noble metal present.

The suitable organic solvent can be (1) a lower aliphatic ester containing 3 to 12 carbon atoms such as methyl acetate, ethyl acetate, butyl acetate, propyl acetate, ethyl propionate and the like, (2) an aldehyde containing 3 to 12 carbon atoms such as butyraldehyde and the like, (3) an alcohol containing 2 to 12 carbon atoms such as ethanol, propanol, butanol and the like, (4) an aliphatic ketone containing 3 to 12 carbon atoms such as acetone, methyl butyl ketone, methyl ethyl ketone and the like or mixtures of such suitable solvents.

The invention will be further illustrated by the following examples although it will be understood that these examples are included merely for purposes of illustration and are not intended to limit the scope of the invention.

EXAMPLE 1

About 36.3 g. of a concentrated tar solution containing more than 90% tar formed in a carbonylation process using a rhodium catalyst and containing 72 ppm rhodium and 2.43% iodine on assay was added to about 250 ml of acetic acid. The mixture is heated to 120° C. and acetic acid is then distilled off and recovered over a period of eight hours. The distillation is continued until about 60 to 70 weight equivalent of acetic acid based on the weight equivalent of the concentrated tar is recovered. Additional acetic acid was added to the reaction during distillation to maintain the volume of acetic acid present at about 250 ml. The distilled acetic acid contains about 80 percent of the iodine contained in the concentrated tar.

The remaining treated concentrated tar is then added to 250 ml methyl acetate and the tar dissolves. The mixture is filtered to remove the solid rhodium from the dissolved tar. The mixture of tar and methyl acetate analyzes as about 6.4 ppm rhodium which corresponds to an 87 percent recovery of the rhodium from the original concentrated tar residue. The acetic acid and iodine recovered from the tar can be returned to the reactor or separated. The remaining tar residue can then be ashed and filtered to recover additional rhodium if desired. The rhodium recovered by filtration and ashing can be added back to the reactor.

EXAMPLE 2

Example 1 was repeated except that the distillation was performed over a period of 2.5 hours removing about 20 weight equivalents of acetic acid per weight equivalent of tar. The distilled acetic acid contains about 38% of the iodine contained in the tar. About 50% of the rhodium is recovered from the tar residue when dissolved in methyl acetate as a precipitate.

EXAMPLE 3

Example 1 was repeated except that the distillation was performed over a five-hour period removing 40 weight equivalents of acetic acid per equivalent of tar. Thusly, 50% of the iodine was codistilled with the acetic acid. The rhodium recovery as a precipitate is about 75%.

EXAMPLE 4

Example 1 was repeated except that acetone was used in place of methyl acetate. The codistilled iodine accounted for 55% of the iodine and 84% of the rhodium was recovered as a precipitate.

EXAMPLE 5

Example 1 was repeated except that ethyl acetate was used in place of methyl acetate. The iodine recovery by codistillation was 51% and the rhodium recovery by precipitation was 83%.

EXAMPLE 6

Example 1 was repeated except that propionic acid was substituted for acetic acid. In this manner, 52% of the iodine was codistilled with the carboxylic acid and 77% of the rhodium recovered as a precipitate.

The invention has been described in detail with particular reference to preferred embodiments thereof, but it will be understood that variations and modifications can be effected within the spirit and scope of the invention.

I claim:

1. A process for the recovery of iodine and rhodium from a tar which is formed during the preparation of acetic anhydride by the carbonylation of methyl acetate in the presence of rhodium which comprises the steps of:
    (1) forming a mixture of the tar and a lower fatty acid,
    (2) heating the mixture of the tar and the lower fatty acid above the boiling point of the fatty acid and removing a mixture of iodine and vaporized lower fatty acid,
    (3) dissolving the residue obtained in step (2) in an organic solvent, and
    (4) recovering the rhodium from the solution obtained in step (3).

2. A process according to claim 1 wherein the lower fatty acid contains 2 to 12 carbon atoms.

3. A process according to claim 2 wherein the fatty acid is acetic acid.

4. A process according to claim 1 wherein the organic solvent is a member of the group consisting of aliphatic esters containing 3 to 12 carbon atoms, aldehydes containing 3 to 12 carbon atoms, alcohols containing 2 to 12 carbon atoms, and aliphatic ketones containing 3 to 12 carbon atoms.

5. A process according to claim 4 wherein the organic solvent is methyl acetate.

6. A process according to claim 1 wherein the weight ratio of tar and lower fatty acid in step (1) is about one part by weight tar to about 1 to 25 parts by weight lower fatty acid.

7. A process according to claim 6 wherein the weight ratio of tar and lower fatty acid is about one part by weight tar to about 2 to 10 parts by weight lower fatty acid.

8. A process for the recovery of iodine and rhodium from a tar which is formed during the preparation of acetic anhydride by the carbonylation of methyl acetate in the presence of rhodium which comprises the steps of:
    (1) forming a mixture of the tar and acetic acid,
    (2) heating the mixture of the tar and acetic acid above the boiling point of acetic acid and removing a mixture of iodine and vaporized acetic acid,
    (3) dissolving the residue obtained in step (2) in methyl acetate, and
    (4) recovering the rhodium from the solution obtained in step (3).

* * * * *